United States Patent [19]

Hill

[11] 4,309,588
[45] Jan. 5, 1982

[54] AIR COOLED GAS SHIELDED ARC TORCH

[75] Inventor: Clifford W. Hill, Florence, S.C.

[73] Assignee: Union Carbide Corporation, New York, N.Y.

[21] Appl. No.: 181,898

[22] Filed: Aug. 27, 1980

[51] Int. Cl.³ .............................................. B23K 9/16
[52] U.S. Cl. ...................................... 219/75; 219/136
[58] Field of Search ................................. 219/75, 136

[56] References Cited

U.S. PATENT DOCUMENTS 1,808,541 6/1931 Gillette .............................. 219/75 X
3,042,791 7/1962 Reeh ................................. 219/136 X Primary Examiner—Elliot A. Goldberg
Attorney, Agent, or Firm—Eugene Lieberstein

[57] ABSTRACT

The torch comprises a collet assembly including a collet body and collet for receiving an electrode; a composite torch head having a barrel shaped end in which the collet assembly is mounted, a tubular shank extending from the barrel shaped end; and a cylindrical handle engaging the tubular shank in a coaxial relation at the forward end thereof. The torch handle has a seal assembly at the rear end thereof for forming a fluid sealed cavity within its interior. A separate power cable and shielding gas hose pass into the cavity through the seal assembly. The shielding gas functions to cool the torch handle and the torch body.

8 Claims, 3 Drawing Figures

U.S. Patent  Jan. 5, 1982  4,309,588
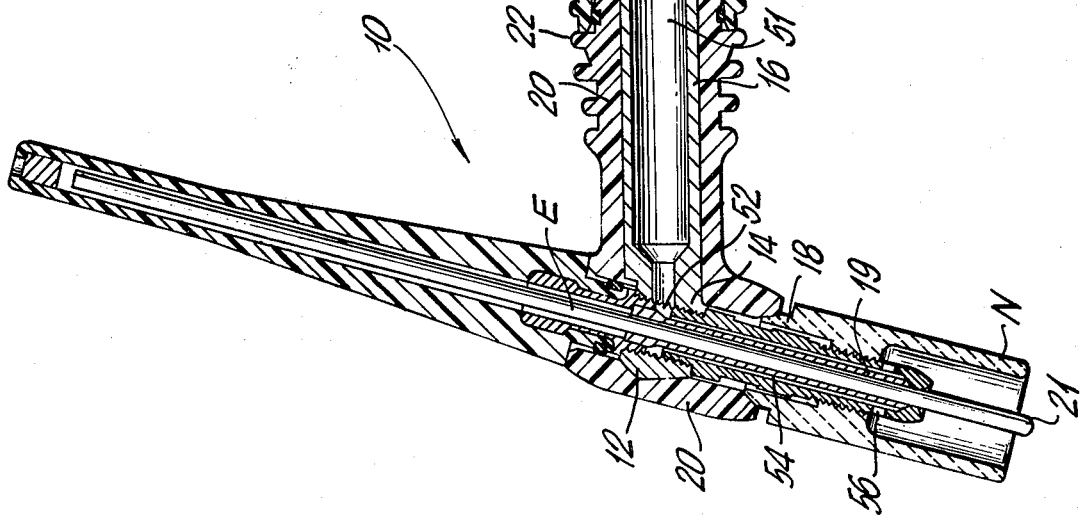
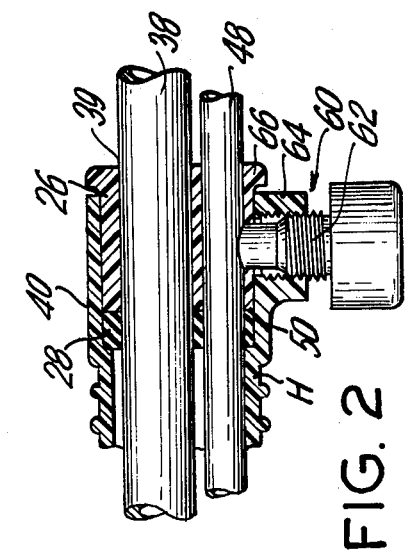
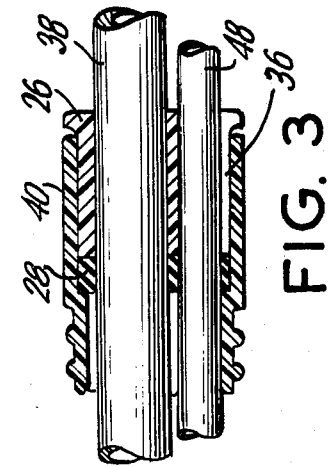

AIR COOLED GAS SHIELDED ARC TORCH

This invention relates to gas shielded arc torches and more particularly to an air cooled gas shielded arc torch having a separate supply hose for the power cable and the shielding gas.

Commercially available gas shielded arc torches which employ separate power and gas supply hoses are relatively high in manufacturing cost and difficult to assemble. One of the reasons for the high manufacturing cost is the present necessity to join the subassemblies of the torch together by brazing. This produces a weakened joint and adds to the assembly cost. In addition, the torch handle in commercially available gas shielded arc torches can become uncomfortably hot particularly when subjected to a relatively long period of continued use.

The gas shielded arc torch of the present invention utilizes a novel design which does not require the brazing of any joints or the use of crimp fittings thereby minimizing assembly and manufacturing cost. Moreover, the arc torch design of the present invention uses the arc shielding gas to internally cool the torch so as to reduce the operating temperature of the torch handle and permit higher current capacity operation. In addition, the torch construction of the present invention is simple to maintain and repair with the power cable being readily replaceable.

It is, therefore, the principal object of the present invention to provide an air cooled gas shielded arc torch employing a separate power cable independent of the gas supply conduit.

It is a further object of the present invention to provide an air cooled gas shielded arc torch wherein the shielding gas flows in intimate contact with the torch handle thereby reducing its operating temperature.

Further objects and advantages of the present invention will become apparent from the following detailed description of the invention when read in conjunction with the accompanying drawings of which:

FIG. 1 is a vertical cross-section through a gas shielded arc torch in accordance with the preferred embodiment of the present invention.

FIG. 2 is a horizontal section of the handle portion of the torch of FIG. 1 showing the preferred valve assembly for controlling the flow of shielding gas through the gas supply conduit; and FIG. 3 is a further horizontal section of the handle portion of the torch of FIG. 1 without the valve assembly of FIG. 2.

The torch 10 of the present invention as illustrated in FIGS. 1 and 2 comprises a head 12 integrally constructed as a one piece body having a barrel shaped end 14 extending from a tubular shank 16. The head 12 should be of a conductive metal such as copper or brass for supplying current to the electrode E through the collet body 18 in a conventional manner. The barrel shaped end 14 of the head 12 is threadably engaged to the collect body 18 in which a collet 19 is mounted for receiving an electrode E. The electrode E extends out from the collet 19 with its tip 21 surrounded by a gas directing nozzle N. The torch head 12 is surrounded by a molded cover 20 of an insulating material preferably of a phenolic resin. A tubular hollow handle H, of any suitable plastic insulating material is threadably engaged to the molded cover 20 in coaxial alignment therewith. The tubular handle H is gas tightly sealed to the cover 20 by means of an O-ring 22. The tubular handle H is used by the operator of the torch 10 for manipulating the torch. It is desirable, although not essential to the present invention, for the exterior surface of the molded cover 20 and/or the handle H to have a ribbed configuration preferably in accordance with the teachings in U.S. Pat. No. 3,216,052, the disclosure of which is herein incorporated by reference. As taught therein, a ribbed configuration with undulating grooves facilitates cooling of the torch handle.

A seal assembly 24 is inserted into the rear end of the handle H as shown in FIGS. 1-3 to form a fluid sealed cavity 30. The seal assembly 24 comprises a terminal support plug 26, preferably molded from a plastic material and a sealing disk 28 of an elastomeric material. The elastomeric sealing disk 28 is inserted into the rear end of the handle H and is pressed against an annular ledge 32 on the inside of the handle H using the support plug 26. This forms a fluid seal at the mating interface 34 between the sealing disk 28 and the ledge 32. To ease assembly and assure proper alignment, a keyway 36 is provided for guiding the support plug 26 into the handle H. The terminal support plug 26 is secured to the handle H by means of a screw 29.

A power cable 38 extends from a source of power (not shown) through an opening 39 in the support plug 26 and through an opening 40 in the elastomeric disk 28 into engagement with the tubular shank 16 of the torch head 12. A fluid seal is formed about the opening 40 in the disk 28 by appropriately sizing the opening 40 relative to the diameter of the power cable 38. The braided copper strands of wire 42 from the power cable 38 are connected to the tubular shank 16 through a set screw 44. Current is thus delivered through the copper wire 42 in the power cable 38, through the tubular shank 16 from whence it passes into the electrode E through the collect body 18 and collet 20.

Shielding gas, such as for example argon, is supplied to the torch 10 through a supply hose 48 which is independent of the power cable 38. The supply hose 48 extends from a source of shielding gas (not shown) into the fluid sealed cavity 30 through the terminal support plug 26 and disk 28. A seal is formed about the opening 50 by an interference fit between the supply hose 48 and the disk 28. The shielding gas is exhausted from the supply hose 48 into the fluid sealed cavity 30 from whence it flows into the interior passageway 51 of the tubular shank 16 through the strands of copper wire 42 in the power cable 38 and around the set screw 44. The shielding gas thereafter flows through the annular space 52 communicating with the cylindrical passageway 54 located between the collet body 18 and the electrode collet 20 and discharges through orifices 56 into the enclosure formed by the nozzle N for shielding the electrode E.

The shielding gas is delivered from the shielding gas hose 48 into the fluid sealed cavity 30 within the handle H so that it preferably passes in direct contact with the inside surface 58 of the handle H thereby tending to cool the handle during torch operation.

The flow of shielding gas is controlled in the preferred embodiment of FIG. 1 by means of a valve assembly 60 illustrated in FIG. 2. The valve assembly 60 includes a valve stem 62 of a nylon or phenolic composition which is threadably engaged into a molded boss 64 on the handle H. The valve stem 62 contacts the sheilding gas hose 48 through an opening 66 in the terminal support plug 26. The flow of shielding gas through the shielding gas hose 48 is controlled by manually turning the threaded valve stem 62 until it controllably closes off the flow of shielding gas.

What is claimed is:

1. In a gas shielded arc torch comprising a torch head having a body in the form of a barrel for supporting a collet body in which a collet is mounted for receiving an electrode, a tubular shank of electrically conductive material extending from said body for supplying current to said electrode through said collet body and collet respectively and forming a passageway for passing a shielding gas through said torch head for shielding said electrode; a hollow handle coupled in a fluid sealed engagement about said shank at the forward end of said handle and extending from said tubular shank in a substantially coaxial relationship therewith; a seal assembly mounted in fluid sealed engagement at the rear end of said handle for forming a fluid sealed cavity within said handle relative to the atmosphere; power supply cable means extending through said seal assembly in electrical engagement with said tubular shank and gas conduit means extending through said seal assembly for exhausting shielding gas into said fluid sealed cavity, whereby said shielding gas substantially cools said handle and torch body before passing over said electrode.

2. In a gas shielded arc torch as defined in claim 1 wherein said torch body and tubular shank are integrally formed as a composite unitary structure.

3. In a gas shielded arc torch as defined in claim 2 further comprising screw means for physically engaging said power supply cable means to said tubular shank.

4. In a gas shielded arc torch as defined in claim 3 wherein said torch head has a molded insulated covering of a plastic resinous material with undulating grooves about the exterior thereof.

5. In a gas shielded arc torch as defined in claim 4 wherein said handle is of a plastic composition having undulating grooves about the exterior thereof.

6. In a gas shielded arc torch as defined in claims 1 or 5 wherein said seal assembly comprises a sealing disk of elastomeric material in sealed engagement with the interior of said handle at the rear end thereof and a terminal support plug.

7. In a gas shielded arc torch as defined in claim 6 further comprising a gas valve seated in said handle for controlling the flow of gas through said gas conduit.

8. In a gas shielded arc torch as defined in claim 7 wherein said gas valve comprises a manually adjustable valve stem threadably engaged to said handle and extending through said terminal support plug in biased engagement with said gas conduit such that the flow of gas through said conduit is controlled by adjustment of said valve stem.

* * * * *